(12) United States Patent
Scheuerman et al.

(10) Patent No.: US 8,167,061 B2
(45) Date of Patent: May 1, 2012

(54) ELECTRIC POWERED CART FOR MOVING LOADS

(75) Inventors: Robert J. Scheuerman, Washington, MI (US); William O. Merkle, Macomb, MI (US); Stephen C Girard, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 12/685,055

(22) Filed: Jan. 11, 2010

(65) Prior Publication Data

US 2011/0168464 A1 Jul. 14, 2011

(51) Int. Cl.
*B60K 1/00* (2006.01)
(52) U.S. Cl. .................................. 180/65.1; 180/65.51
(58) Field of Classification Search ................ 180/65.1, 180/65.51, 65.6, 65.8
See application file for complete search history.

(56) References Cited

U.S. PATENT DOCUMENTS

| | | | | |
|---|---|---|---|---|
| 2,860,719 A | * | 11/1958 | Furches | 180/432 |
| 3,380,546 A | * | 4/1968 | Rabjohn | 180/15 |
| 3,524,512 A | * | 8/1970 | Barnowsky et al. | 180/14.1 |
| 3,572,455 A | * | 3/1971 | Brueske | 180/214 |
| 3,989,116 A | * | 11/1976 | Hirano | 180/19.3 |
| 4,526,248 A | * | 7/1985 | Johansen | 180/89.1 |
| 4,538,695 A | * | 9/1985 | Bradt | 180/19.2 |
| 4,570,731 A | * | 2/1986 | Oaks | 180/19.3 |
| 4,639,004 A | * | 1/1987 | Maeda et al. | 280/5.32 |
| 4,750,578 A | * | 6/1988 | Brandenfels | 180/13 |
| 4,848,504 A | * | 7/1989 | Olson | 180/19.1 |
| 5,151,004 A | * | 9/1992 | Johnson | 414/495 |
| 5,161,635 A | * | 11/1992 | Kiffe | 180/19.3 |
| 5,307,889 A | * | 5/1994 | Bohannan | 180/13 |
| 5,322,409 A | * | 6/1994 | McCluney | 414/528 |
| 5,366,036 A | * | 11/1994 | Perry | 180/65.1 |
| 5,403,026 A | * | 4/1995 | Dahl | 280/156 |
| 5,820,146 A | * | 10/1998 | Van Ligten | 280/87.041 |
| 6,129,166 A | * | 10/2000 | Sueshige et al. | 180/65.6 |
| 6,330,926 B1 | * | 12/2001 | Heimbrock et al. | 180/65.51 |
| 6,571,896 B2 | * | 6/2003 | Roberts | 180/65.1 |
| 6,588,523 B2 | * | 7/2003 | Heimbrock et al. | 180/65.51 |
| 6,644,004 B2 | * | 11/2003 | Reimers et al. | 56/14.7 |
| 6,772,850 B1 | * | 8/2004 | Waters et al. | 180/65.51 |
| 6,793,248 B1 | * | 9/2004 | Sung | 280/781 |
| 6,902,019 B2 | * | 6/2005 | Heimbrock et al. | 180/65.51 |
| 6,948,577 B2 | * | 9/2005 | Wakitani et al. | 180/65.1 |
| 6,976,287 B2 | * | 12/2005 | Muth | 15/340.1 |
| 6,993,799 B2 | * | 2/2006 | Foster et al. | 5/510 |
| 7,007,765 B2 | * | 3/2006 | Waters et al. | 180/19.3 |
| 7,017,691 B2 | * | 3/2006 | Lu | 180/65.1 |
| 7,018,157 B2 | * | 3/2006 | Gallant et al. | 414/495 |
| 7,073,613 B2 | * | 7/2006 | Wakitani et al. | 180/6.5 |
| 7,108,090 B2 | * | 9/2006 | Turner | 180/65.51 |
| 7,191,854 B2 | * | 3/2007 | Lenkman | 180/65.1 |
| 7,195,253 B2 | * | 3/2007 | Vogel et al. | 280/19.1 |
| 7,293,621 B2 | * | 11/2007 | Long | 180/165 |
| 7,328,761 B1 | * | 2/2008 | Tyler | 180/13 |
| 7,407,024 B2 | * | 8/2008 | Vogel et al. | 180/19.3 |
| 7,686,145 B2 | * | 3/2010 | Akagi et al. | 192/13 R |
| 7,762,363 B1 | * | 7/2010 | Hirschfeld | 180/65.1 |

(Continued)

*Primary Examiner* — J. Allen Shriver, II
*Assistant Examiner* — Erez Gurari

(57) ABSTRACT

A cart for moving loads includes a frame supported on wheels, a source of electric power supported on the frame, a drive system including a traction motor connected to the power source for driving a wheel secured to the frame and contacting ground, and a controller for adjusting a rotary direction of the drive wheel in response to selected states of an input to the controller.

18 Claims, 2 Drawing Sheets

U.S. PATENT DOCUMENTS

| | | | |
|---|---|---|---|
| 7,823,675 B2 * | 11/2010 | Kermani | 180/210 |
| 7,828,092 B2 * | 11/2010 | Vogel et al. | 180/19.3 |
| 7,845,655 B2 * | 12/2010 | Lawson et al. | 280/79.4 |
| 7,887,076 B2 * | 2/2011 | Adams | 280/210 |
| 7,905,304 B2 * | 3/2011 | Adachi | 180/12 |
| 7,975,790 B2 * | 7/2011 | Kim et al. | 180/65.51 |
| 8,016,301 B2 * | 9/2011 | Figel et al. | 280/47.38 |
| 2003/0085063 A1 * | 5/2003 | Wakitani et al. | 180/65.1 |
| 2003/0085064 A1 * | 5/2003 | Turner | 180/65.5 |
| 2003/0222449 A1 * | 12/2003 | Wang | 280/781 |
| 2005/0098364 A1 * | 5/2005 | Johnson et al. | 180/65.1 |
| 2005/0127657 A1 * | 6/2005 | Wu | 280/781 |
| 2006/0096793 A1 * | 5/2006 | Akagi et al. | 180/65.1 |
| 2006/0103115 A1 * | 5/2006 | Kelso | 280/649 |
| 2006/0181041 A1 * | 8/2006 | Feldman | 280/47.131 |
| 2006/0260852 A1 * | 11/2006 | Wu | 180/65.1 |
| 2008/0196951 A1 * | 8/2008 | Gal et al. | 180/65.1 |
| 2009/0000839 A1 * | 1/2009 | Ishii et al. | 180/65.5 |
| 2009/0272594 A1 * | 11/2009 | Bussinger | 180/264 |
| 2010/0007111 A1 * | 1/2010 | Adams | 280/210 |
| 2010/0032223 A1 * | 2/2010 | Kermani | 180/216 |
| 2011/0042912 A1 * | 2/2011 | Kermani | 280/62 |

* cited by examiner

ELECTRIC POWERED CART FOR MOVING LOADS

BACKGROUND OF INVENTION

The present invention relates generally to an apparatus for transporting heavy loads on the floor of a factory or assembly plant. More particularly, the invention relates to a cart controlled by a vehicle operator and powered by onboard electric energy.

Various techniques used to transport material and components between workstations on a factory floor include conveyors such as conventional belt conveyors, fork trucks and manned tuggers. However, when the transported load is heavy, in the range of about 2000 pounds, ergonometric guidelines frequently limit the ability to use conventional media to perform this function without exceeding the guidelines.

A preferable technique would provide a vehicle that operates under electric power and is guided by a vehicle operator to transport relatively heavy loads along any undefined path. The vehicle or cart would produce no noxious exhaust gas. The onboard power source, electric storage batteries, would be rechargeable easily and quickly at convenient locations in the factory or assembly plant.

Preferably a cart for this purpose would be manufactured at minimal cost and could carry its own power supply, traction drive and controller for selecting drive direction and speed. The cart would be steered manually on caster wheels.

SUMMARY OF INVENTION

A cart for moving loads includes a frame supported on wheels, a source of electric power supported on the frame, a drive system including a traction motor connected to the power source for driving a wheel secured to the frame and contacting ground, and a controller for adjusting a rotary direction of the drive wheel in response to selected states of an input to the controller.

The vehicle and its operating systems are assembled readily and installed easily on the cart's frame or vehicle's chassis at low cost and without a high degree of technical complexity or sophistication.

The truck provides a high level of capability and flexibility that surpasses that of alternative transportation techniques, and meets or exceeds safety specifications for a power assist device at a substantially lower cost that otherwise commercially available.

The truck is a relatively inexpensive device that assists production operators and material handling personnel to move loads of about one ton around a production plant.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
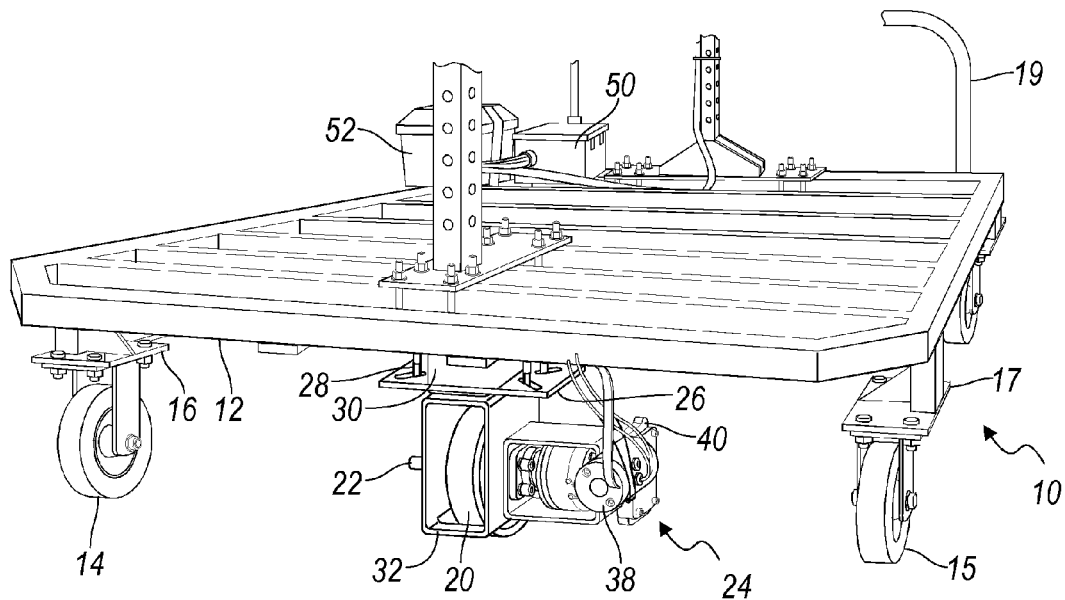
FIG. 1 is a perspective view of a cart supported on wheels and a system for driving the cart.

Referring now to the drawings, illustrated in FIG. 1 is a cart 10, which includes a rectangular welded frame 12 formed preferably of rolled or extruded members, each member having a closed cross section in the form of a rectangular, preferably square, tube. The frame 12 is supported on a first set of caster wheels 14, 15, each wheel bolted to a support 16, 17, respectively, which is located at a corner of the frame 12 and welded to the lower surface of the frame 12. A second set of wheels similarly mounted to the frame 12, but located at the opposite end of the frame 12, are on casters to facilitate steering the vehicle. A handle 19, secured to the end of the frame where the caster wheels are located, is used to apply a lateral steering force manually to the cart.

A single drive wheel 20, in traction contact with the floor is aligned with a central longitudinal axis of the frame 12, evenly spaced between wheels 14, 15. Drive wheel 20 is supported on a drive shaft 22, whose axis is directed laterally and is located in a substantially horizontal plane. In one application of the cart 10, the wheel 20 has an outer diameter of about eight inches, and the diameter of drive shaft 22 is ⅝ inches.

Figure 2:
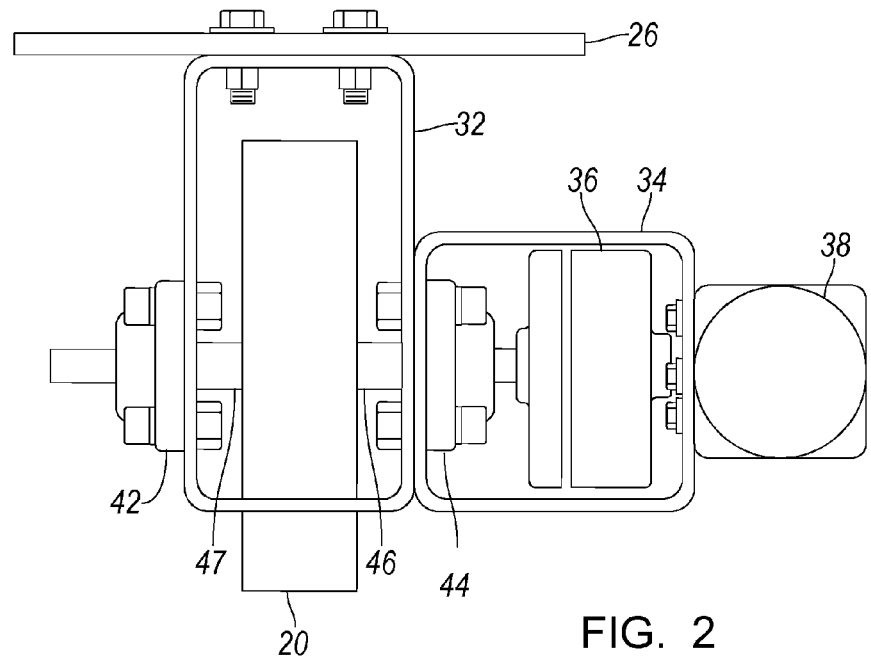
FIG. 2 is a perspective view showing the drive system installed on the frame of FIG. 1.

FIGS. 1 and 2 show that the drive wheel 20 and its drive system 24 are mounted on the underside of the frame 12. A plate 26 is supported on bolts 28, which are secured to the frame 12. The length of rectangular steel tubing 30, supported on the plate 26 and contacting the lower surface of frame 12, establishes the vertical location of the plate 26. A wheel housing 32, formed by a length of rectangular steel tubing located at the underside of the plate 26, is bolted to the plate 26. A clutch housing 34, formed by a length of rectangular steel tubing located at a lateral side of the wheel housing 32 is bolted to the wheel housing 32.

The drive system includes a clutch unit 36, located in clutch housing 34; a cart drive motor 38; a gear unit 40 for transmitting rotating power from the motor to the clutch unit; a flange bearing 42 bolted to the outer wall of wheel housing 32; a flange bearing 44 bolted to the inner walls of the clutch housing 34 and wheel housing 32; and bronze wheel bushing spacers 46, 47, which enclose the drive shaft 22 between the bearings 42, 44. Drive shaft 22 is secured to the drive wheel 20, which extends downward through the lower wall of the wheel housing 32.

Clutch unit 36 alternately opens and closes a drive connection between the drive wheel 20 and gear unit 40 in response the presence and absence of electric current supplied to a solenoid of the clutch unit. The cart 10 supports onboard electric storage batteries 52, which supply the electric current to the clutch unit 36.

A controller or control box 50 for controlling operation of the motor 38 and clutch unit 36 is supported on the frame 12. Batteries 52, interconnected to produce 24V output, are connected to the control box 50. Electric current carried on line 54 (shown in FIG. 3) from control box 50 is supplied to the clutch unit 36 and cart motor 38.

Figure 3:
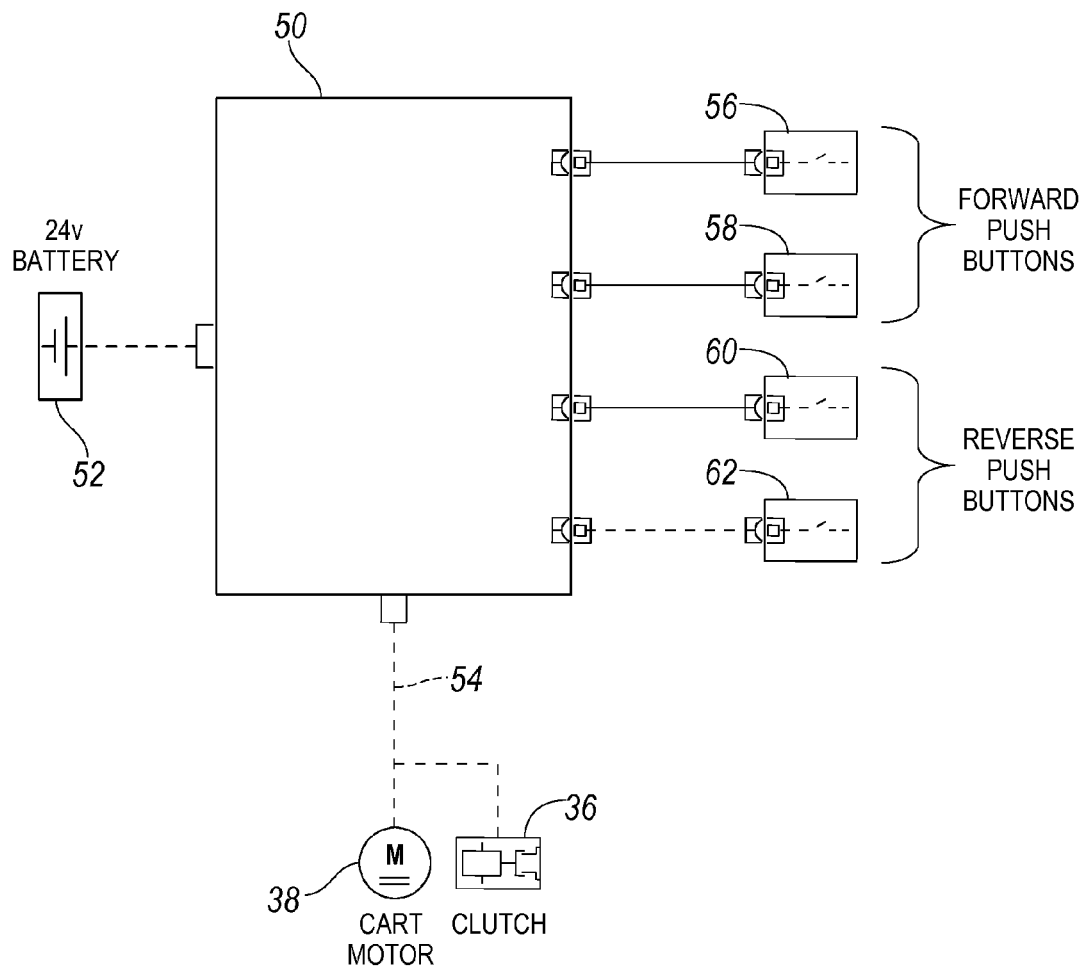
FIG. 3 is a schematic diagram showing a control box for controlling forward and reverse drive in response to the current state of switching devices such as push buttons.

FIG. 3 illustrates the control box and interconnections with it in more detail. The control circuit inside control box 50 is controlled manually from outside the box through two forward-drive push buttons 56, 58 and two reverse-drive push buttons 60, 62. When both of the forward drive push buttons 56, 58 are depressed, two switches in the control circuit open an electrical connection between the terminals of batteries 52 and a motor controller, which causes the motor 38 to rotate the drive wheel 20 in the forward direction, thereby producing forward drive of the cart. When either of the forward drive push buttons 56, 58 is released from its depressed state, power to the drive wheel 20 is discontinued, thereby stopping the cart 10.

When both of the reverse drive push buttons 60, 62 are depressed, two switches in the control circuit close an electrical connection between the terminals of batteries 52 and the motor controller, which causes the motor 38 to rotate drive wheel 20 in a reverse drive direction, thereby producing reverse drive of the cart. When either of the reverse drive push buttons 60, 62 is released from its depressed state, power to the drive wheel 20 is discontinued, thereby stopping the cart 10.

The requirement that two push buttons be depressed concurrently to drive the cart in either direction is a safety precaution intended to avoid personal injury and property damage due to use of the cart.

A plug-in battery charger (not shown) is used to recharge the batteries 52 from a power source preferably connect to a public utility grid.

In operation, an operator standing near the cart 10 selects forward or rearward drive by depressing the appropriate push buttons. The drive system 24 responds to the operator's input by transmitting power to the drive wheel 20 in the selected direction. An operator, accompanying the cart along its travel to a desired location, steers the cart by applying a relatively low magnitude of laterally-directed manual steering force to handle 19.

While certain embodiments of the present invention have been described in detail, those familiar with the art to which this invention relates will recognize various alternative designs and embodiments for practicing the invention as defined by the following claims.

What is claimed is:

1. A cart for moving loads, comprising:
   a frame supported on wheels;
   a source of electric power supported on the frame;
   a drive system including a traction motor connected to the power source for driving a wheel secured to the frame and contacting ground;
   a controller for adjusting a rotary direction of the drive wheel in response to selected states of an input to the controller;
   a plate supported on bolts secured to the frame;
   a length of rectangular tubing supported on the plate and contacting a lower surface of the frame;
   a wheel housing formed from a length of rectangular tubing located at the underside of the plate and bolted to the plate; and
   a clutch housing formed from a length of rectangular tubing located at a lateral side of the wheel housing and bolted to the wheel housing.

2. The cart of claim 1, wherein the drive system further includes:
   a clutch located in a drive path between the motor and the drive wheel, for alternately opening and closing a drive connection between the traction motor and the drive wheel.

3. The cart of claim 1, wherein the drive system further includes:
   a gear unit driveably connected to the traction motor for transmitting rotating power produced by the traction motor;
   a clutch located in a drive path between the gear unit and the drive wheel, for alternately opening and closing a drive connection between the gear drive and the drive wheel.

4. The cart of claim 1, wherein the frame is formed of interconnected members, each member having closed cross section in the form of a rectangular tube.

5. The cart of claim 1, wherein the drive system further comprises:
   a clutch unit located in the clutch housing;
   a gear unit for transmitting rotating power from the motor to the clutch unit;
   a first flange bearing bolted to a wall of the wheel housing;
   a second flange bearing bolted to the clutch housing and the wheel housing; and
   a drive shaft secured to the drive wheel, driveably connected to an output of the clutch unit.

6. The cart of claim 1, wherein the drive wheel extends downward through a lower wall of the wheel housing into contact with the ground.

7. The cart of claim 5, further comprising bronze wheel bushing spacers that enclose the drive shaft between the flange bearings.

8. The cart of claim 5, wherein:
   the power source comprises at least one electric storage battery supported on the frame; and
   the controller further comprises a control box supported on the frame and including first and second switching elements that are activated to produce forward drive of the cart, and third and fourth switching elements that are activated to produce reverse drive of the cart.

9. The cart of claim 1, wherein the source of electric power is a rechargeable electric storage battery supported on the frame.

10. A cart for moving loads, comprising:
    a frame supported on wheels;
    a source of electric power supported on the frame;
    a drive system including a traction motor connected to the power source for driving a wheel secured to the frame and contacting ground;
    a plate supported on bolts secured to the frame;
    a length of rectangular tubing supported on the plate and contacting a lower surface of the frame;
    a wheel housing formed from a length of rectangular tubing located at the underside of the plate and bolted to the plate; and
    a clutch housing formed from a length of rectangular tubing located at a lateral side of the wheel housing and bolted to the wheel housing; and
    a controller for adjusting a rotary direction of the drive wheel in response to selected states of an input to the controller.

11. The cart of claim 10, wherein the drive system further includes a clutch located in the clutch housing in a drive path between the motor and the drive wheel, for alternately opening and closing a drive connection between the traction motor and the drive wheel.

12. The cart of claim 10, wherein the drive system further includes:
    a gear unit driveably connected to the traction motor for transmitting rotating power produced by the traction motor; and
    a clutch located in the clutch housing in a drive path between the motor and the drive wheel, for alternately opening and closing a drive connection between the traction motor and the drive wheel.

13. The cart of claim 10, wherein the frame is formed of interconnected members, each member having closed cross section in the form of a rectangular tube.

14. The cart of claim 10, wherein the drive wheel extends downward through a lower wall of the wheel housing into contact with the ground.

15. The cart of claim 10, wherein the drive system further comprises:
   a clutch unit located in the clutch housing;
   a gear unit for transmitting rotating power from the motor to the clutch unit;
   a first flange bearing bolted to a wall of the wheel housing;
   a second flange bearing bolted to the clutch housing and the wheel housing; and
   a drive shaft secured to the drive wheel 20, driveably connected to an output of the clutch unit.

16. The cart of claim 15, further comprising bronze wheel bushing spacers that enclose the drive shaft between the flange bearings.

17. The cart of claim 10, wherein:
   the power source comprises at least one electric storage battery supported on the frame; and
   the controller further comprises a control box supported on the frame and including first and second switching elements that are activated to produce forward drive of the cart, and third and fourth switching elements that are activated to produce reverse drive of the cart.

18. The cart of claim 10, wherein the source of electric power is a rechargeable electric storage battery supported on the frame.

\* \* \* \* \*